US012564976B2

(12) United States Patent　(10) Patent No.:　US 12,564,976 B2
Wu　(45) Date of Patent:　Mar. 3, 2026

(54) HANDHELD ELECTRIC PET TRIMMING DEVICE

(71) Applicant: NINGBO ICLIPPER ELECTRIC APPLIANCE CO., LTD, Ningbo (CN)

(72) Inventor: Haoze Wu, Ningbo (CN)

(73) Assignee: NINGBO ICLIPPER ELECTRIC APPLIANCE CO., LTD, Ningbo (CN)

( * ) Notice: Subject to any disclaimer, the term of this patent is extended or adjusted under 35 U.S.C. 154(b) by 615 days.

(21) Appl. No.: 17/965,464

(22) Filed: Oct. 13, 2022

(65) Prior Publication Data

US 2024/0033958 A1　Feb. 1, 2024

(51) Int. Cl.
|  |  |
|---|---|
| *B26B 19/44* | (2006.01) |
| *A01K 13/00* | (2006.01) |
| *B26B 19/24* | (2006.01) |
| *B26B 19/38* | (2006.01) |
| *B26B 19/48* | (2006.01) |

(52) U.S. Cl.
CPC .............. *B26B 19/44* (2013.01); *A01K 13/00* (2013.01); *B26B 19/24* (2013.01); *B26B 19/3873* (2013.01); *B26B 19/48* (2013.01)

(58) Field of Classification Search
CPC ..... B26B 19/24; B26B 19/3873; B26B 19/44; B26B 19/48; A47L 9/242; A01K 13/00
See application file for complete search history.

(56) References Cited

U.S. PATENT DOCUMENTS

| | | | | |
|---|---|---|---|---|
| 1,549,839 | A | * | 8/1925 | Kuehne .................... B26B 19/44 30/218 |
| 1,643,559 | A | * | 9/1927 | Hicks ....................... B26B 19/44 30/133 |
| 2,292,453 | A | * | 8/1942 | La Mere ................. B26B 19/44 30/131 |
| 2,297,735 | A | * | 10/1942 | Allen ...................... B26B 19/44 30/133 |
| 2,641,790 | A | * | 6/1953 | Coult ...................... B26B 19/44 15/352 |
| 2,697,876 | A | * | 12/1954 | Blanchard ............... B26B 19/44 30/133 |

(Continued)

FOREIGN PATENT DOCUMENTS

| | | | | | |
|---|---|---|---|---|---|
| CN | | 108202348 | A | * | 6/2018 ............. B26B 19/44 |
| CN | | 111360882 | A | * | 7/2020 ............. B26B 19/44 |

(Continued)

*Primary Examiner* — Jason Daniel Prone

(57) ABSTRACT

A handheld electric pet trimming device includes a vacuum cleaner, a hose, an adapter and an electric trimming tool; the electric trimming tool is internally provided with a charging battery, and the electric trimming tool is provided with an air suction port connected to the hose; the adapter further includes a first connector, a second connector and a connecting pipe, one end of the hose is connected to the vacuum cleaner, another end of the hose is connected to first connector; the second connector is connected to the electric trimming tool; the first connector is provided with an annular groove, and the connecting pipe is provided with at least one of mounting buckles which are radially and rotatably clamped in the annular groove; the second connector is connected to the connecting pipe, the adapter forms a channel communicating with the air suction port and the hose.

8 Claims, 6 Drawing Sheets

(56) References Cited

U.S. PATENT DOCUMENTS

| | | | | |
|---|---|---|---|---|
| 2,748,472 A * | 6/1956 | Sheley et al. | B26B 19/44 | 30/41.5 |
| 2,807,086 A * | 9/1957 | Watkins | B26B 19/44 | 30/41.5 |
| 3,050,767 A * | 8/1962 | Rankin | B26B 19/44 | 15/422 |
| 3,384,919 A * | 5/1968 | Jording et al. | B26B 19/44 | 30/133 |
| 3,417,194 A * | 12/1968 | MEeyer et al. | B26B 19/44 | 285/133.11 |
| 3,832,753 A * | 9/1974 | Crooks | A47L 9/06 | 15/415.1 |
| 3,994,042 A * | 11/1976 | Zakis | B26B 19/44 | 15/312.1 |
| 4,077,122 A * | 3/1978 | Rollor, Jr. | B26B 19/44 | 30/41.5 |
| 4,216,581 A * | 8/1980 | Van Slooten | B26B 19/44 | 30/133 |
| 4,550,957 A * | 11/1985 | Keane | A47L 9/2868 | 439/13 |
| 4,550,958 A * | 11/1985 | Smith | A47L 9/2868 | 439/13 |
| 4,557,535 A * | 12/1985 | Keane | A47L 9/246 | 439/13 |
| 4,634,197 A * | 1/1987 | Horlacher, Jr. | H01R 31/06 | 439/192 |
| 4,704,794 A * | 11/1987 | Paradis | B26B 19/44 | 30/201 |
| 4,843,717 A * | 7/1989 | Crane | B26B 19/44 | 30/41.6 |
| 5,039,133 A * | 8/1991 | Albrecht | A47L 9/242 | 285/298 |
| 5,088,199 A * | 2/1992 | Romani | B26B 19/44 | 30/132 |
| 5,153,994 A * | 10/1992 | Emmett | B26B 19/44 | 30/41.6 |
| 5,269,073 A * | 12/1993 | Johnson | B26B 19/44 | 30/133 |
| 5,755,578 A * | 5/1998 | Contant | A47L 9/242 | 15/377 |
| 5,924,202 A * | 7/1999 | Romani | B26B 19/44 | 30/132 |
| 7,278,662 B1 * | 10/2007 | Bristor | A47L 9/242 | 285/272 |
| 7,488,004 B1 * | 2/2009 | Romani | A47L 9/242 | 285/280 |
| 7,537,457 B2 * | 5/2009 | Rashkover | B26B 19/44 | 439/13 |
| 7,914,291 B2 * | 3/2011 | Rashkover | B26B 19/44 | 439/13 |
| 8,484,853 B1 * | 7/2013 | Laube | B26B 19/44 | 30/216 |
| 9,374,982 B2 * | 6/2016 | Liang | A47L 7/02 | |
| D838,061 S * | 1/2019 | Wu | D30/158 | |
| 10,703,000 B2 * | 7/2020 | Li | B26B 19/44 | |
| 11,160,426 B1 * | 11/2021 | Williamson | A47L 9/242 | |
| 11,697,215 B2 * | 7/2023 | Tellez | B26B 19/44 | 83/13 |
| 11,910,780 B2 * | 2/2024 | Peng | A47L 9/22 | |
| 2020/0078953 A1 * | 3/2020 | Dai | B26B 19/44 | |
| 2024/0268346 A1 * | 8/2024 | Homa | B26B 19/44 | |
| 2024/0341275 A1 * | 10/2024 | Homa | B26B 19/44 | |

FOREIGN PATENT DOCUMENTS

| | | | | | |
|---|---|---|---|---|---|
| CN | 116197950 A | * | 6/2023 | | B26B 19/44 |
| DE | 202023000376 U1 | * | 3/2023 | | B26B 19/44 |
| KR | 20000020208 U | * | 11/2000 | | B26B 19/00 |
| KR | 20210052906 A | * | 5/2021 | | B26B 19/44 |
| KR | 20240001977 U | * | 12/2024 | | B26B 19/3873 |
| WO | WO-2024114632 A1 | * | 6/2024 | | B26B 19/28 |
| WO | WO-2025103210 A1 | * | 5/2025 | | A47L 7/00 |

* cited by examiner

HANDHELD ELECTRIC PET TRIMMING DEVICE

TECHNICAL FIELD

This invention generally relates to the technical field of electric trimming devices, and more particularly, to a handheld electric pet trimming device.

BACKGROUND

Along with the societal development, electric trimming tools, such as electric scissors, shaving knives and nail sharpeners have been extensively used in people's daily lives. For the conventional trimming tools, hair and debris must be manually collected. For example, when using a conventional shaving knife, the hair shaved off must be cleaned manually, and when using a conventional pet electric push-shaver for removing a pet's floating hair, the hair removed also have to be manually collected. To solve this problem, a trimming tools connecting to a vacuum cleaner started to appear on the market. They commonly comprise a tool body, a connecting hose and a vacuum cleaner. Its operating principle is: when the vacuum cleaner creates a negative pressure, the hair and debris removed by the tool are absorbed into the vacuum cleaner through a negative pressure channel such that the functions of removing hair while vacuuming are realized.

However, when using the aforesaid trimming tool, to achieve a comfortable trimming angle, a user needs to rotate it from time to time. When the trimming tool is continuously rotated, the connecting hose may easily be tangled, which in turn narrows the negative pressure channel. Presently, there is a need to cause the hair and debris smoothly enter the vacuum cleaner from the inlet of the negative pressure channel. Under such circumstances, a 360-degree connecting structure is needed. Moreover, the electric trimming tool is powered by the vacuum cleaner, resulting in complicated circuit structure and high manufacturing cost.

SUMMARY

The purpose of the present invention is to provide a handheld electric pet trimming device. According to the present invention, a 360-degree free rotation of the adapter is being used, which effectively solves the technical problem relating to a narrowed negative pressure channel due to the winding of the hose caused by the continuous rotation.

To achieve the above purpose, the present invention adopts the following technical solution: a handheld electric pet trimming device comprises a vacuum cleaner, a hose, an adapter and an electric trimming tool, wherein one end of the hose is connected to the vacuum cleaner, the other end of the hose is connected to the adapter, and the adapter is connected to the electric trimming tool. The electric trimming tool is internally provided with a charging battery, the hose is internally provided with an air duct communicating with the vacuum cleaner, and the electric trimming tool is provided with an air suction port connected to the air duct. The adapter further comprises a first connector, a second connector and a connecting pipe, wherein the first connector is connected to the hose, and the second connector is connected to the electric trimming tool. The first connector is provided with an annular groove, and the connecting pipe is provided with a mounting buckle for axially interacting with the annular groove in a limiting manner. The connecting pipe may rotate relative to the first connector, and the second connector is fixedly connected to the connecting pipe or formed on the connecting pipe. The first connector, the second connector and the connecting pipe form a channel communicating with the air suction port and the air duct.

In another embodiment of the present invention, one end of the connecting pipe corresponding to the first connector is provided with at least one group of elastic arms, and the mounting buckles are arranged at the ends of the elastic arms.

In another embodiment of the present invention, the outer periphery of the first connector is sleeved with a limiting sleeve, and the limiting sleeve limits the elastic arms such that the mounting buckles are prevented from being separated from the first connector.

In another embodiment of the present invention, the limiting sleeve is provided with a first limiting portion, and the connecting pipe is provided with a first limiting groove for interacting with the first limiting portion. Through the interaction between the first limiting portion and the first limiting groove, the rotation of the limiting sleeve relative to the connecting pipe in radial direction is limited.

In another embodiment of the present invention, one end of the connecting pipe close to the second connector is provided with a second limiting portion, and the second connector is provided with a second limiting groove for interacting with the second limiting portion. Through the interaction between the second limiting portion and the second limiting groove, the rotation of the connecting pipe relative to the second connector in radial direction is limited.

In another embodiment of the present invention, the adapter comprises an elastic clamping arm. The elastic clamping arm further comprises an arm body and elastic clamping portions symmetrically arranged on two sides of the arm body. The arm body is fixedly mounted on the second connector, and the connecting pipe is provided with a buckling groove for interacting with the elastic clamping portion in a limiting manner.

In another embodiment of the present invention, the elastic clamping portion further comprises a connecting portion and a bent portion, wherein one end of the connecting portion is connected to the arm body, and the other end of the connecting portion is connected to the bent portion. The connecting portion inclines from the outer side to the inner side, and the bent portion is arranged on the inner side of the connecting portion.

In another embodiment of the present invention, the electric trimming tool further comprises a main body and a plurality of tool heads, wherein the plurality of tool heads may be selected according to actual needs.

In another embodiment of the present invention, the main body is internally provided with a wireless charging module, and a wireless charging base is arranged separately or integrated with the vacuum cleaner.

In another embodiment of the present invention, the main body is internally provided with a charging port.

Compared with the prior art, the present invention has the following advantages:

1) The adapter adopts a 360-degree free rotation design. Thus, the technical problem relating to the narrowed negative pressure channel due to the winding of the hose caused by the continuous rotation is effectively solved, which allows the hair and debris to smoothly enter the vacuum cleaner through the air suction port;

2) The electric trimming tool 4 are compatible to a plurality of tool heads (e.g., an electric hair cutting head, a shaving head and a nail polishing head). The main body is shared by the plurality of tool heads, which makes the electric trimming tool universal and economic;

3) A charging battery is arranged in the electric trimming tool. The electric trimming tool may be charged in a wireless mode or a wired mode, achieving a simpler circuit structure.

In FIGURES: 1—Vacuum Cleaner, 2—Hose, 21—Air Duct, 3—Adapter, 31—The First Connector, 311—Annular Groove, 312—Annular Recess, 32—The Second Connector, 321—The Second Limiting Groove, 322—Protruding Edge, 33—Connecting Pipe, 331—Mounting Buckle, 332—Elastic Arm, 333—The First Limiting Groove, 334—The Second Limiting Portion, 335—Buckling Groove, 34—Limiting Sleeve, 341—The First Limiting Portion, 342—Accommodating Space, 343—Limiting Ring, 35—Elastic Clamping Arm, 351—Arm Body, 352—Elastic Clamping Portion, 3521—Connecting Portion, 3522—Bent Portion, 36—Channel, 4—Electric Trimming Tool, 41—Charging Battery, 42—Air Suction Port, 43—Main Body, 431—Air Guide Channel, 44—Tool Head.

DETAILED DESCRIPTION

Drawings are combined hereinafter to elaborate the technical solution of the present invention.

Figure 1:
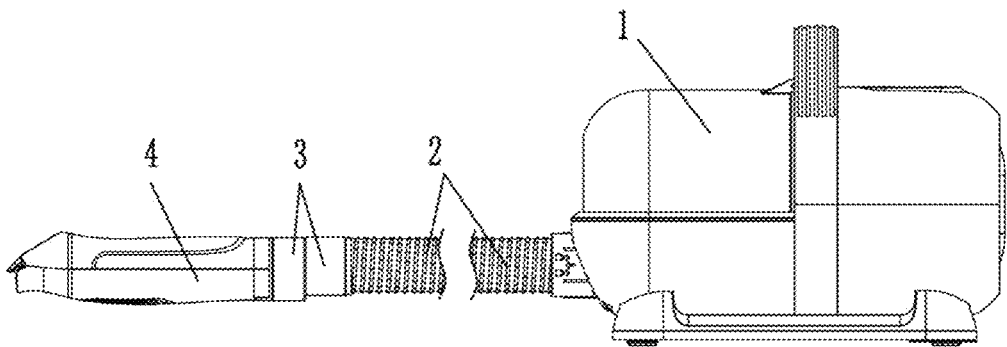
FIG. 1 is a conceptual diagram illustrating an exemplary structure of the present invention.
Figure 2:
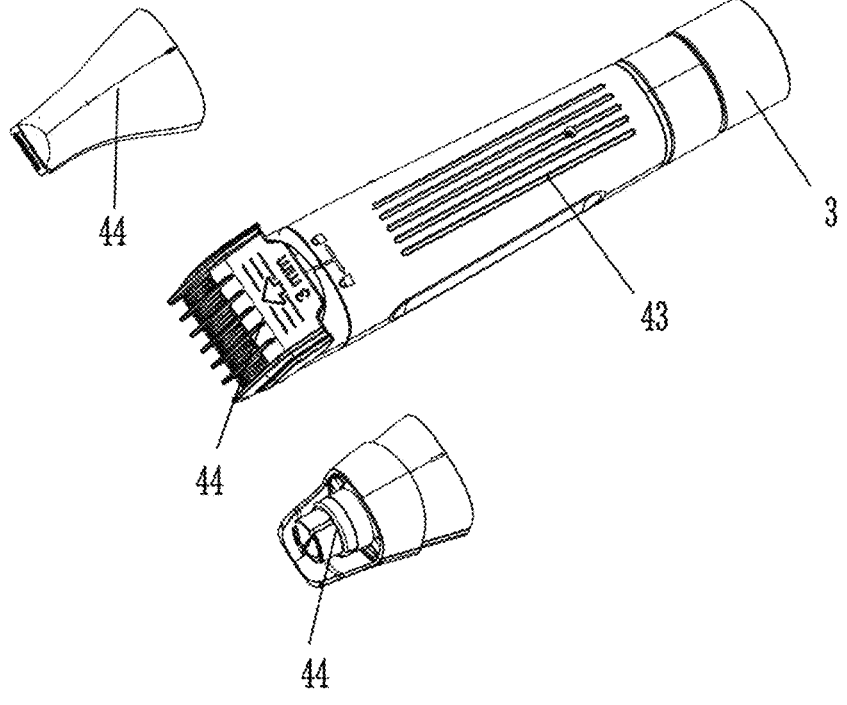
FIG. 2 is a conceptual diagram illustrating an exemplary structure of the main body and the plurality of tool heads of the present invention.
Figure 3:
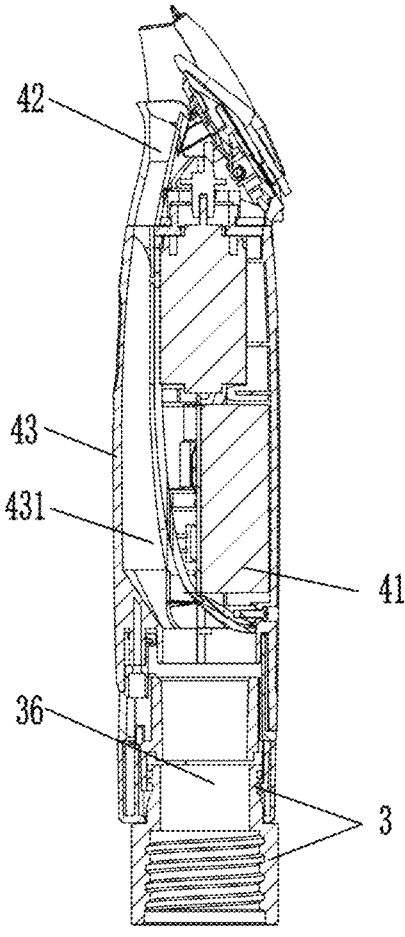
FIG. 3 is a conceptual diagram illustrating a sectional view of the electric trimming tool of the present invention.
Figure 4:
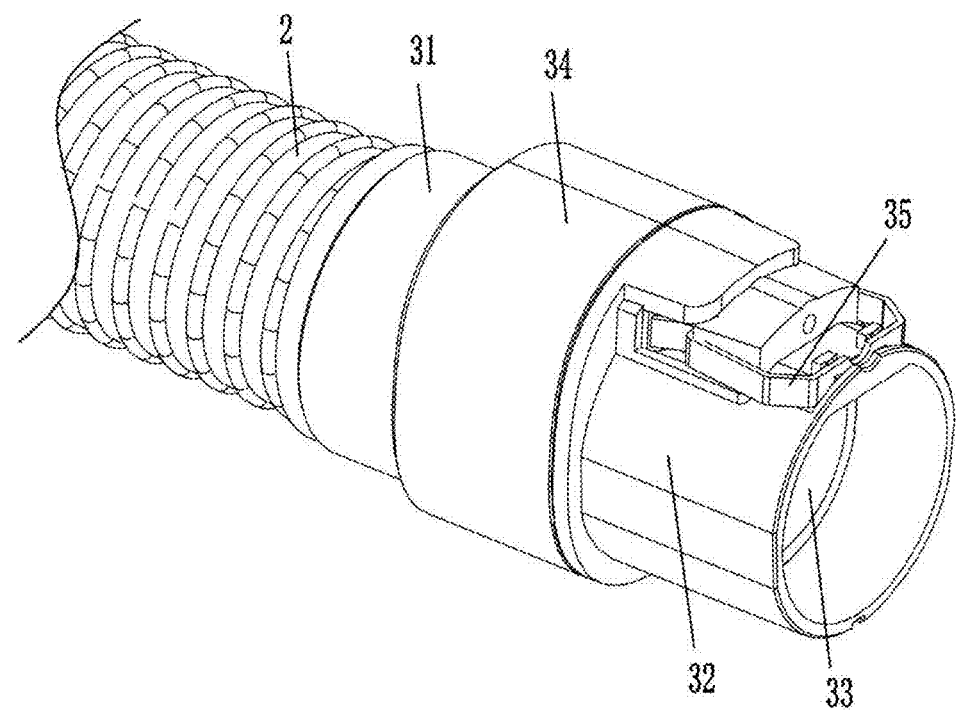
FIG. 4 is a conceptual diagram illustrating an exemplary structure of the adapter and the hose of the present invention.
Figure 5:
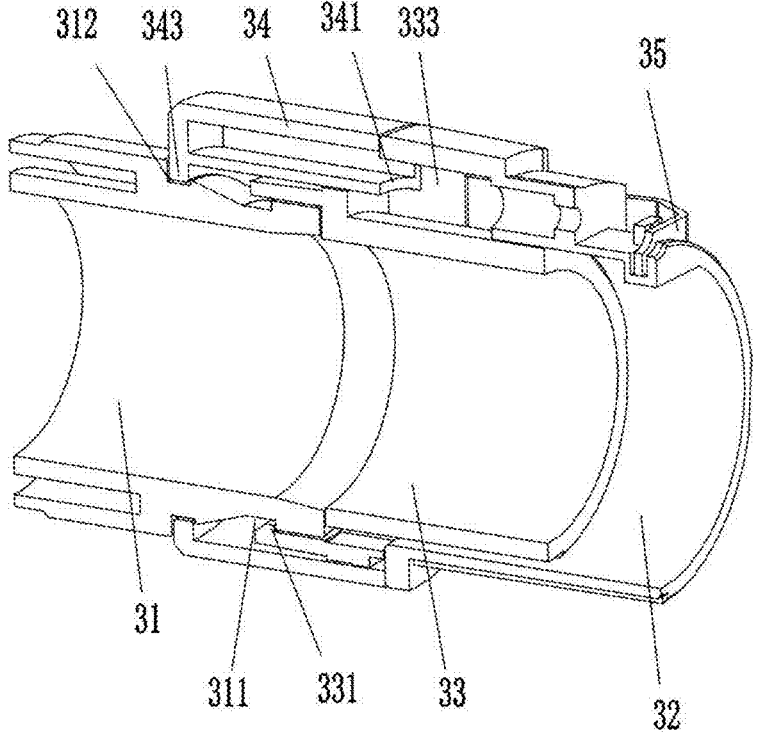
FIG. 5 is a conceptual diagram illustrating a three-dimensional sectional view of the adapter.
Figure 6:
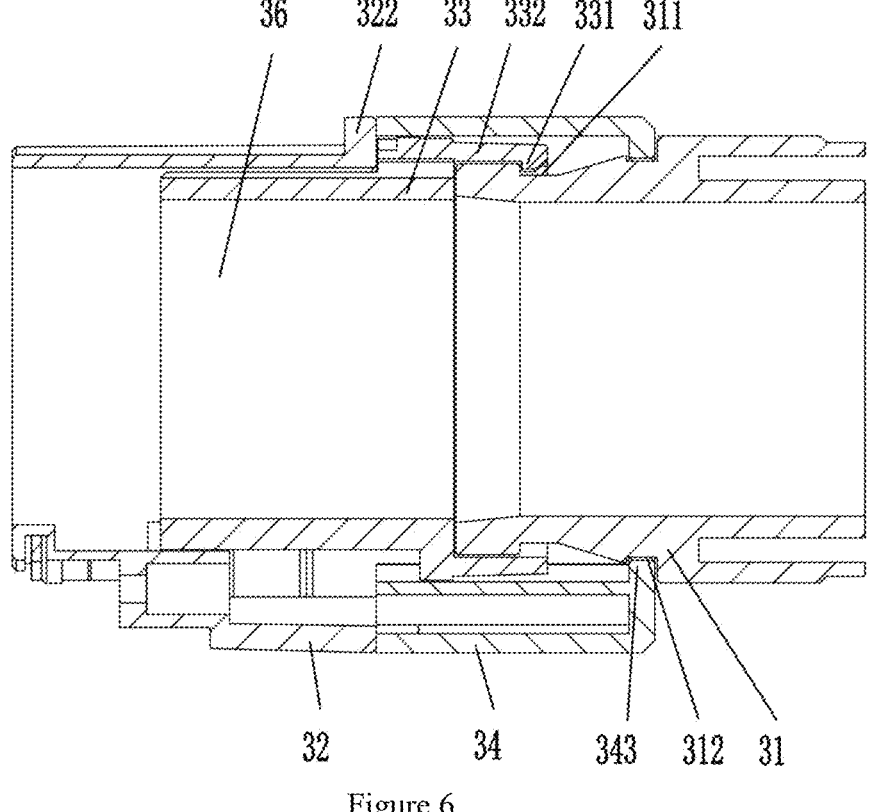
FIG. 6 is a conceptual diagram illustrating a sectional view of the adapter from a first viewing angle.
Figure 7:
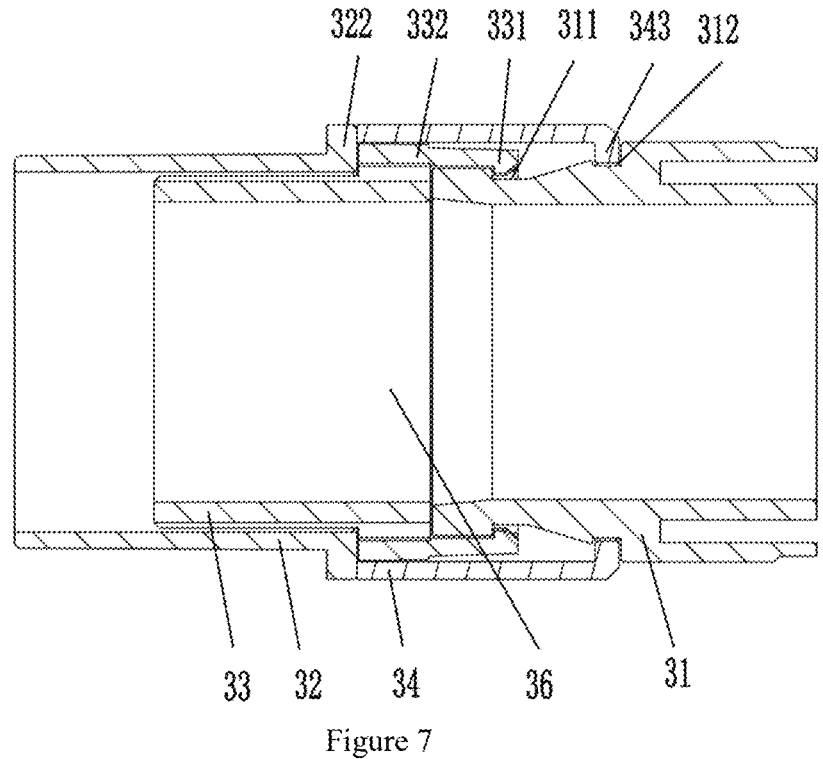
FIG. 7 is a conceptual diagram illustrating a sectional view of the adapter from a second viewing angle.
Figure 8:
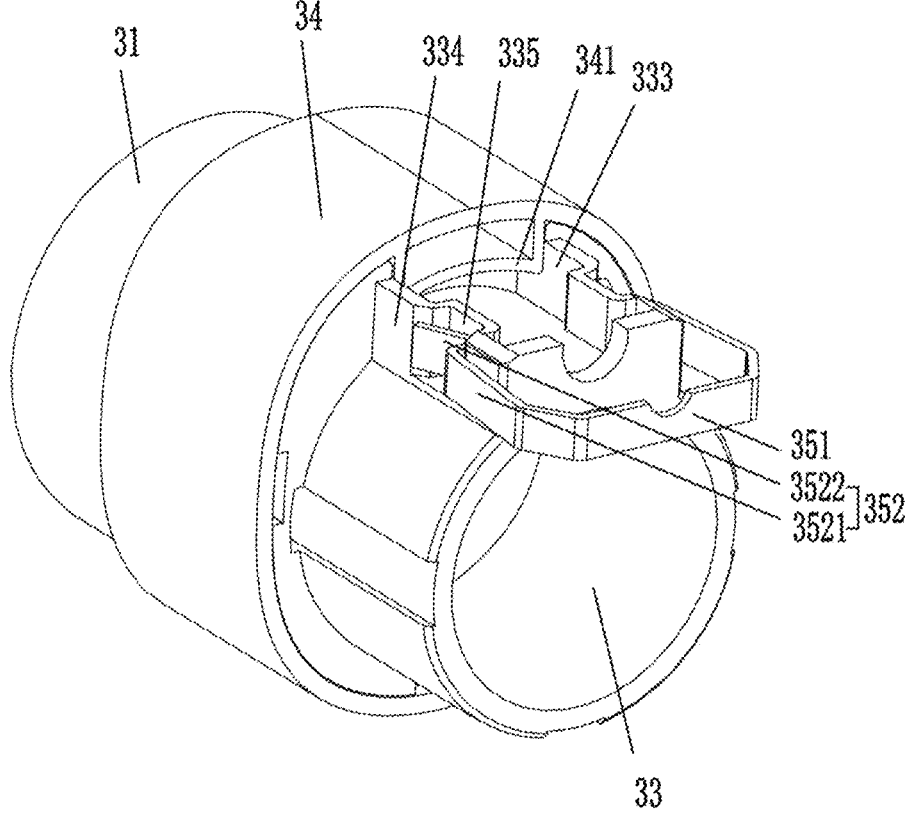
FIG. 8 is a conceptual diagram illustrating an exemplary structure of the elastic clamping portion and the buckling groove of the present invention.
Figure 9:
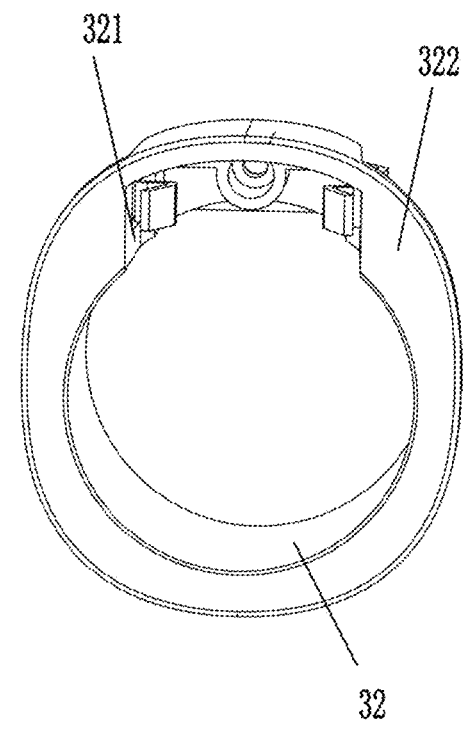
FIG. 9 is a conceptual diagram illustrating an exemplary structure of the second connector.
Figure 10:
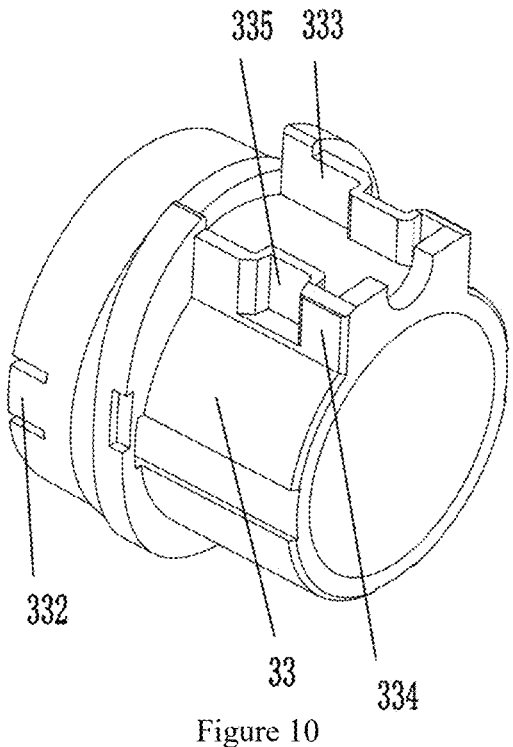
FIG. 10 is a conceptual diagram illustrating an exemplary structure of the connecting pipe of the present invention.

As shown in FIGS. 1-10, a handheld electric pet trimming device comprises a vacuum cleaner 1, a hose 2, an adapter 3 and an electric trimming tool 4, wherein one end of the hose 2 is connected to the vacuum cleaner 1, the other end of the hose 2 is connected to the adapter 3, and the adapter 3 is connected to the electric trimming tool 4. The electric trimming tool 4 is internally provided with a charging battery 41, the hose 2 is internally provided with an air duct 21 communicating with the vacuum cleaner 1, and the electric trimming tool 4 is provided with an air suction port 42 connected to the air duct 21.

The electric trimming tool 4 further comprises a main body 43 and a plurality of tool heads 44, wherein the plurality of tool heads 44 may be selected according to actual needs. The main body 43 is internally provided with an air guide channel 431 communicating with the air suction port 42 and a channel 36 of the adapter 3. The electric trimming tool 4 are compatible to a plurality of tool heads 44 (e.g., an electric hair cutting head, a shaving head and a nail polishing head). The main body 43 is shared by the plurality of tool heads, which makes the electric trimming tool 4 universal and economic. The electric trimming tool 4 may be charged in a wireless mode or a wired mode. When in the wireless charging mode, the main body 43 is internally provided with a wireless charging module electrically connected to the charging battery 41, and a wireless charging base is arranged separately or integrated with the vacuum cleaner 1. When in the wired charging mode, the main body 43 is internally provided with a charging port, and the charging battery 41 is arranged in the electric trimming tool 4. The aforesaid design allows the electric trimming tool to be charged in a wireless mode or a wired mode, achieving a simpler circuit structure and a convenient charging.

The adapter 3 further comprises a first connector 31, a second connector 32 and a connecting pipe 33, wherein the first connector 31 is connected to the hose 2, and the first connector 31 and the hose 2 may adopt a threaded connection or a fixed plug-in connection. The second connector 32 is connected to the electric trimming tool 4, the first connector 31 is provided with an annular groove 311, and the connecting pipe 33 is provided with a mounting buckle 331 axially interacting with the annular groove 311 in a limiting manner. The connecting pipe 33 may rotate relative to the first connector 31, and the second connector 32 is fixedly connected to the connecting pipe 33 or formed on the connecting pipe 33. The first connector 31, the second connector 32 and the connecting pipe 33 form a channel 36 communicating with the air suction port 42 and the air duct 21.

One end of the connecting pipe 33 corresponding to the first connector 31 is provided with at least one group of elastic arms 332, and the mounting buckles 331 are arranged at the ends of the elastic arms 332. In the present invention, there are two groups of elastic arms 332, and the mounting buckles 331 correspond to the elastic arms 332 in a one-to-one manner.

The outer periphery of the first connector 31 is sleeved with a limiting sleeve 34, and the limiting sleeve 34 limits the elastic arms 332 such that the mounting buckles 331 are prevented from being separated from the first connector 31. More specifically, the outer periphery of the first connector 31 is provided with an annular recess 312, and the limiting sleeve 34 is provided with a limiting ring 343 axially interacting with the annular recess 312 in a limiting manner. Through adopting the aforesaid arrangement, the first connector 31 is axially limited relative to the limiting sleeve 34 while being capable of rotating relative to the limiting sleeve 34.

The limiting sleeve 34 is provided with a first limiting portion 341, and the connecting pipe 33 is provided with a first limiting groove 333 for interacting with the first limiting portion 341. Through the interaction between the first limiting portion 341 and the first limiting groove 333, the rotation of the limiting sleeve 34 relative to the connecting pipe 33 in radial direction is limited. By means of the aforesaid design, the limiting sleeve 34 and the connecting pipe 33 are capable of rotating synchronously relative to the first connector 31.

One end of the connecting pipe 33 close to the second connector 32 is provided with a second limiting portion 334, and the second connector 32 is provided with a second limiting groove 321 for interacting with the second limiting portion 334. Through the interaction between the second limiting portion 334 and the second limiting groove 321, the rotation of the connecting pipe 33 relative to the second connector 32 in radial direction is limited. One end of the second connector 32 close to the first connector 31 is provided with a protruding edge 322. The limiting sleeve 34 and the connecting pipe 33 are axially limited by means of the protruding edge 322. Further, the adapter 3 comprises an elastic clamping arm 35. The elastic clamping arm 35 further comprises an arm body 351 and elastic clamping portions 352 symmetrically arranged on two sides of the arm body 351. The arm body 351 is fixedly mounted on the second connector 32, and the connecting pipe 33 is provided with a buckling groove 335 for interacting with the elastic clamping portion 352 in a limiting manner. Through adopting this arrangement, a 360-degree rotation of the adapter is achieved. Namely, the assembly comprising the second connector 32, the connecting pipe 33 and the limiting sleeve 34 may rotate in 360 degrees relative the first connector 31. Therefore, the technical problem relating to the narrowed negative pressure channel due to the winding of the hose 2 caused by the continuous rotation is effectively solved, which allows the hair and debris to smoothly enter the vacuum cleaner 1 through the air suction port 42.

The elastic clamping portion 352 further comprises a connecting portion 3521 and a bent portion 3522, wherein one end of the connecting portion 3521 is connected to the arm body 351, and the other end of the connecting portion 3521 is connected to the bent portion 3522. The connecting portion 3521 inclines from the outer side to the inner side, and the bent portion 3522 is arranged on the inner side of the connecting portion 3521. The bent portion 3522 of the elastic clamping portion 352 is snap-fitted with the buckling groove 335 such that the connecting pipe 33 and the second connector 32 are connected. Thus, a convenient assembly is achieved.

The above are merely preferred embodiments of the present invention. Therefore, equivalent changes or modifications made according to the structures, features and principles described in the specification of the present invention shall fall into the scope defined by the claims of the present invention.

What is claimed is:

1. A handheld electric pet trimming device, comprising:
a vacuum cleaner (1),
a hose (2),
an adapter (3), and
an electric trimming tool (4), wherein the electric trimming tool (4) is internally provided with a charging battery (41), and the electric trimming tool (4) is provided with an air suction port (42) connected to the hose (2), wherein the adapter (3) further comprising: a first connector (31), a second connector (32) and a connecting pipe (33), wherein one end of the hose (2) is connected to the vacuum cleaner (1), another end of the hose (2) is connected to the first connector (31);
wherein the second connector (32) is connected to the electric trimming tool (4), wherein the first connector (31) is provided with an annular groove (311), and the connecting pipe (33) is provided with a at least one of mounting buckles (331) the mounting buckles (331) are radially and rotatably clamped in the annular groove (311), wherein the connecting pipe (33) is capable of rotating relative to the first connector (31), and the second connector (32) is fixedly connected to the connecting pipe (33) or formed on the connecting pipe (33), wherein the first connector (31), the second connector (32) and the connecting pipe (33) form a channel (36) communicating with the air suction port (42) and the hose (2).

2. The handheld electric pet trimming device of claim 1, wherein one end of the connecting pipe (33) close to the first connector (31) is provided with at least one of elastic arms (332), and wherein each of the mounting buckles (331) is arranged at an end of each of the elastic arms (332).

3. The handheld electric pet trimming device of claim 2, wherein an outer periphery of the first connector (31) is sleeved with a limiting sleeve (34), and the limiting sleeve (34) limits the elastic arms (332) such that the mounting buckles (331) are prevented from being separated from the first connector (31);
wherein the limiting sleeve (34) is connected to the connecting pipe (33), an end of the second connector (32) close to the first connector (31) is provided with a protruding edge (322) which is in abutting contact with the limiting sleeve (34).

4. The handheld electric pet trimming device of claim 3, wherein the limiting sleeve (34) is provided with a first limiting portion (341), and the connecting pipe (33) is provided with a first limiting groove (333) for interacting with the first limiting portion (341), wherein the first limiting portion (341) is axially inserted in the first limiting groove (333), to limit a rotation of the limiting sleeve (34) relative to the connecting pipe (33) in radial direction.

5. The handheld electric pet trimming device of claim 4, wherein an outer wall of the connecting pipe (33) is provided with a second limiting portion (334), the first limiting groove (333) is arranged in the second limiting portion (334), and the second connector (32) is provided with a second limiting groove (321) for interacting with the second limiting portion (334), wherein the second limiting portion (334) is axially inserted in the second limiting groove (321).

6. The handheld electric pet trimming device of claim 5, wherein the adapter (3) further comprising an elastic clamping arm (35), wherein the elastic clamping arm (35) further comprising an arm body (351) and elastic clamping portions (352) symmetrically arranged on two sides of the arm body (351), wherein the arm body (351) is fixedly mounted on the second connector (32), wherein buckling grooves (335) are form on an outer wall of the second limiting portion (334), each of the elastic clamping portions (352) is clamped in each of the buckling grooves (335).

7. The handheld electric pet trimming device of claim 6, wherein the elastic clamping portion (352) further comprising a connecting portion (3521) and a bent portion (3522), wherein one end of the connecting portion (3521) is connected to the arm body (351), and another end of the connecting portion (3521) is connected to the bent portion (3522), wherein the connecting portion (3521) inclines from an outer side to an inner side, and the bent portion (3522) is arranged on the inner side of the connecting portion (3521).

8. The handheld electric pet trimming device of claim 1, wherein the electric trimming tool (4) further comprising a main body (43) and one of a plurality of tool heads (44), wherein each of the tool heads is capable of being connected with the main body (43) for a specific task.

* * * * *